United States Patent
Hatanaka

(10) Patent No.: US 8,838,303 B2
(45) Date of Patent: Sep. 16, 2014

(54) VEHICLE SYSTEM CONTROL DEVICE

(75) Inventor: Keita Hatanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/825,580

(22) PCT Filed: Nov. 5, 2010

(86) PCT No.: PCT/JP2010/069738
§ 371 (c)(1),
(2), (4) Date: Mar. 22, 2013

(87) PCT Pub. No.: WO2012/060015
PCT Pub. Date: May 10, 2012

(65) Prior Publication Data
US 2013/0184905 A1    Jul. 18, 2013

(51) Int. Cl.
*B60W 20/00*    (2006.01)
*B60L 7/14*    (2006.01)
*B60W 10/08*    (2006.01)
*B60W 10/06*    (2006.01)
*B60L 11/14*    (2006.01)

(52) U.S. Cl.
CPC ............... *B60W 20/108* (2013.01); *B60L 7/14* (2013.01); *B60L 2210/30* (2013.01); *B60L 2200/26* (2013.01); *B60L 2240/547* (2013.01); *B60W 10/08* (2013.01); *B60W 10/06* (2013.01); *Y02T 10/7077* (2013.01); *Y10S 903/93* (2013.01); *B60L 2240/12* (2013.01); *Y02T 10/642* (2013.01); *B60L 2210/40* (2013.01); *B60L 2240/429* (2013.01); *B60L 11/14* (2013.01); *B60L 2240/549* (2013.01); *Y02T 10/7241* (2013.01); *B60L 2240/427* (2013.01)

USPC ........... 701/19; 701/22; 105/26.05; 105/34.2; 105/49; 105/61.5; 903/930

(58) Field of Classification Search
CPC .............. B60K 6/20; B60K 6/42; B60K 6/44; B60K 6/442; B60W 20/00; B60W 20/10; B60W 20/20
See application file for complete search history.

(56) References Cited

U.S. PATENT DOCUMENTS 5,806,617 A    9/1998 Yamaguchi
8,136,454 B2 *    3/2012 Barbee et al. ................... 105/50
(Continued)

FOREIGN PATENT DOCUMENTS

JP    8-294205 A    11/1996
JP    2001-136603 A    5/2001
(Continued)

OTHER PUBLICATIONS

International Search Report (PCT/ISA/210) issued on Feb. 15, 2011, by the Japanese Patent Office as the International Searching Authority for International Application No. PCT/JP2010/069738.
(Continued)

*Primary Examiner* — Jonathan M Dager
(74) *Attorney, Agent, or Firm* — Buchanan Ingersoll & Rooney PC

(57)    ABSTRACT

A diesel-hybrid control device according to the present invention generates an instruction signal for instructing about a driving force of a storage battery car constituting a vehicle system of a train and driven by a motor, and includes a driving-force instruction unit that generates an instruction signal for instructing about a driving force of a railcar constituting the vehicle system and driven by a diesel engine. The driving-force instruction unit generates an instruction signal for instructing to start driving the storage battery car and generates an instruction signal for instructing to be on standby for driving the railcar at a time of starting the train.

1 Claim, 7 Drawing Sheets

(56) References Cited

U.S. PATENT DOCUMENTS

| | | | |
|---|---|---|---|
| 8,196,518 B2* | 6/2012 | Bachman | 105/35 |
| 8,342,103 B2* | 1/2013 | Barbee et al. | 105/50 |
| 8,408,144 B2* | 4/2013 | Read | 105/26.05 |
| 8,413,589 B2* | 4/2013 | Iden | 105/35 |
| 8,482,151 B2* | 7/2013 | Emerson et al. | 307/9.1 |
| 8,600,590 B2* | 12/2013 | Frazier et al. | 701/19 |
| 8,640,629 B2* | 2/2014 | Barbee et al. | 105/61 |
| 2007/0272116 A1* | 11/2007 | Bartley et al. | 105/35 |
| 2008/0121136 A1* | 5/2008 | Mari et al. | 105/35 |
| 2010/0106343 A1* | 4/2010 | Donnelly et al. | 700/295 |
| 2010/0174473 A1* | 7/2010 | Pursifull et al. | 701/112 |
| 2011/0174561 A1* | 7/2011 | Bowman | 180/65.245 |
| 2013/0030632 A1* | 1/2013 | Bissontz | 701/22 |
| 2013/0049364 A1* | 2/2013 | Teets et al. | 290/45 |
| 2013/0152815 A1* | 6/2013 | Kanda | 105/35 |

FOREIGN PATENT DOCUMENTS

| | | |
|---|---|---|
| JP | 2004-282859 A | 10/2004 |
| JP | 2006-238542 A | 9/2006 |
| JP | 2007-124802 A | 5/2007 |
| JP | 2007-143290 A | 6/2007 |

OTHER PUBLICATIONS

Written Opinion (PCT/ISA/237) issued on Feb. 15, 2011, by the Japanese Patent Office as the International Searching Authority for International Application No. PCT/JP2010/069738.

Notice of Rejection dated Jun. 13, 2011, issued in corresponding Japanese Application No. 2011-518971 and an English translation thereof. (6 pages).

* cited by examiner

VEHICLE SYSTEM CONTROL DEVICE

FIELD

The present invention relates to a vehicle system control device.

BACKGROUND

A conventional railcar transmits an output of a diesel engine through a torque converter to a wheel to directly drive the wheel. Therefore, there are problems of low fuel efficiency, high noise level, and the like at the time of starting and accelerating. A storage battery car that uses electric power from a storage battery does not have the problems described above for the railcar. However, the storage battery car is more expensive than the railcar and needs to be charged frequently, and therefore is not suitable for a long-distance operation.

Patent Literature 1 mentioned below discloses a diesel hybrid vehicle in which a diesel engine drives a power generator, and electric power from the power generator and electric power from a storage battery serve as a power supply.

CITATION LIST

Patent Literature

Patent Literature 1: Japanese Patent Application Laid-open No. 2004-282859

SUMMARY

Technical Problem

In the diesel hybrid vehicle described in Patent Literature 1 mentioned above, a diesel engine drives a power generator, and electric power from the power generator and electric power from a storage battery serve as a power supply, which is friendly to the environment. However, there has been a problem that the diesel hybrid vehicle cannot solve the problems of conventional railcars, such as low fuel efficiency and high noise level at the time of starting and accelerating.

In a case of employing the diesel hybrid vehicle described in Patent Literature 1 mentioned above, it is necessary to manufacture a new vehicle or modify an existing railcar on a large scale. Therefore, there has been a problem that the existing railcar cannot be effectively utilized.

The present invention has been achieved to solve the above problems, and an object of the present invention is to provide a vehicle system control device that can effectively utilize the existing railcar, and also improve fuel efficiency and reduce noise level at the time of starting and accelerating.

Solution to Problem

In order to above-mentioned problems and achieve the object of the present invention, there is provided a vehicle system control device that controls a vehicle system of a train in which a railcar that is capable of running by itself by driving a wheel using an output of a diesel engine and a storage battery car that is capable of running by itself by driving a wheel by a motor driven by electric power from a storage battery are coupled, wherein the storage battery car includes a driving-force instruction unit that provides an instruction signal for instructing about a driving force to a railcar control device included in the railcar and a storage-battery-car control device included in the storage battery car, the driving-force instruction unit generates an instruction signal for instructing to start driving the storage battery car and generates an instruction signal for instructing to be on standby for driving the railcar at a time of starting the train, allocates a driving force to the railcar and to the storage battery car at a time of accelerating after starting the train, and generates an instruction signal for instructing about a driving force of the railcar and an instruction signal for instructing about a driving force of the storage battery car based on an allocation result, the railcar control device outputs a command to the diesel engine and controls the diesel engine based on the instruction signal generated by the driving-force instruction unit, and when a running distance from the time of starting the train is equal to or longer than a threshold value, the driving-force instruction unit generates an instruction signal for instructing to start driving the railcar by a diesel engine, generates an instruction signal for instructing about a driving force of the railcar, and generates an instruction signal for instructing about a driving force, obtained by subtracting a driving force instructed as a driving force of the railcar from a desired driving force of the train, as a driving force of the storage battery car.

Advantageous Effects of Invention

According to the present invention, existing railcars can be effectively utilized, and fuel efficiency can be improved and noise level can be reduced at the time of starting and accelerating.

DESCRIPTION OF EMBODIMENTS

Exemplary embodiments of a vehicle system control device according to the present invention will be explained below in detail with reference to the accompanying drawings. The present invention is not limited to the embodiments.

First Embodiment.

Figure 1:
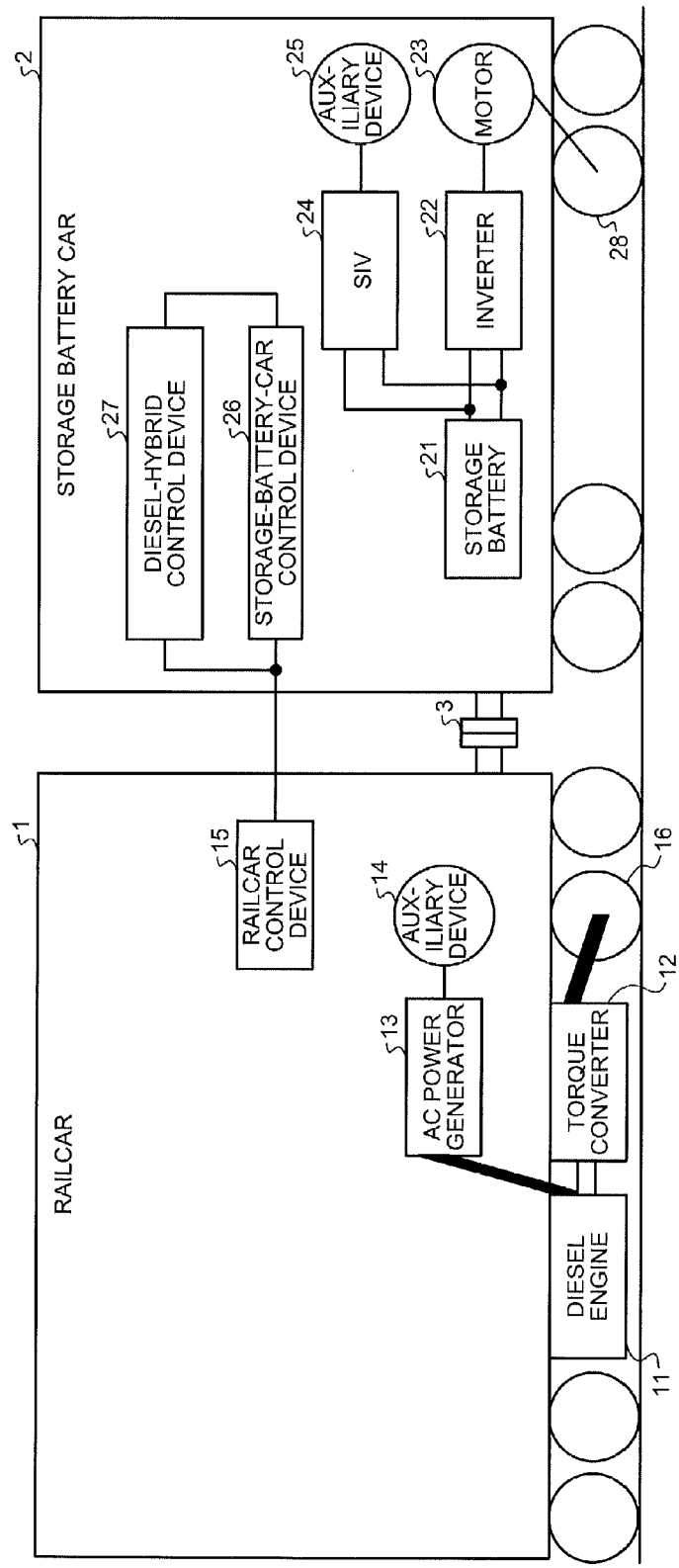
FIG. 1 is a configuration example of a vehicle system according to a first embodiment.

FIG. 1 is a configuration example of a vehicle system including a vehicle system control device according to a first embodiment of the present invention. As shown in FIG. 1, the vehicle system according to the present embodiment is constituted by a railcar 1 and a storage battery car 2, and the railcar 1 and the storage battery car 2 are coupled by a coupler 3. The vehicle system according to the present embodiment is a vehicle system that constitutes a train.

The railcar 1 transmits an output of a diesel engine 11 through a torque converter 12 to a wheel 16 to drive the wheel 16 and to run. The diesel engine 11 drives an AC power generator 13. The AC power generator 13 supplies AC power to an auxiliary device 14. A railcar control device 15 controls the overall operation of the railcar 1. The railcar i has the same configuration as a conventional general railcar, and therefore existing railcars can be used.

In the storage battery car 2, an inverter 22 converts DC power of a storage battery 21 into AC power. The AC power drives a motor 23. The motor 23 drives a wheel 28 to run the storage battery car 2. Furthermore, an SIV (Static InVerter: auxiliary power-supply device) 24 converts DC power of the storage battery 21 into AC power to supply the AC power to an auxiliary device 25. A storage-battery-car control device 26 controls the overall operation of the storage battery car 2. A diesel-hybrid control device 27 controls the railcar 1 and the storage battery car 2 to operate in a coordinated manner. The storage battery car 2 except the diesel-hybrid control device 27 has the same configuration as a conventional general storage battery car.

The diesel-hybrid control device 27 is a vehicle system control device that executes a diesel hybrid control in the vehicle system including the railcar 1 and the storage battery car 2. In the present embodiment, the diesel-hybrid control device 27 and the storage-battery-car control device 26 are shown as separate constituent elements. However, the diesel-hybrid control device 27 and the storage-battery-car control device 26 can be integrated into one as the vehicle system control device. Furthermore, a device further including the storage battery 21, the inverter 22, the motor 23, the SIV 24, the storage-battery-car control device 26, and the diesel-hybrid control device 27 can also serve as the vehicle system control device.

The railcar 1 and the storage battery car 2 are coupled by the coupler 3, and the railcar control device 15 in the railcar 1 and the diesel-hybrid control device 27 in the storage battery car 2 are connected by a wire or the like. The railcar 1 and the storage battery car 2 are not necessarily directly coupled with each other, and can be coupled through another car. The railcar control device 15 in the railcar 1 and the diesel-hybrid control device 27 in the storage battery car 2 are connected to an operator cab (not shown) in the train, and execute a control based on a notch command that is an operation command from the operator cab (such as accelerating, braking (decelerating), and coasting).

Figure 2:
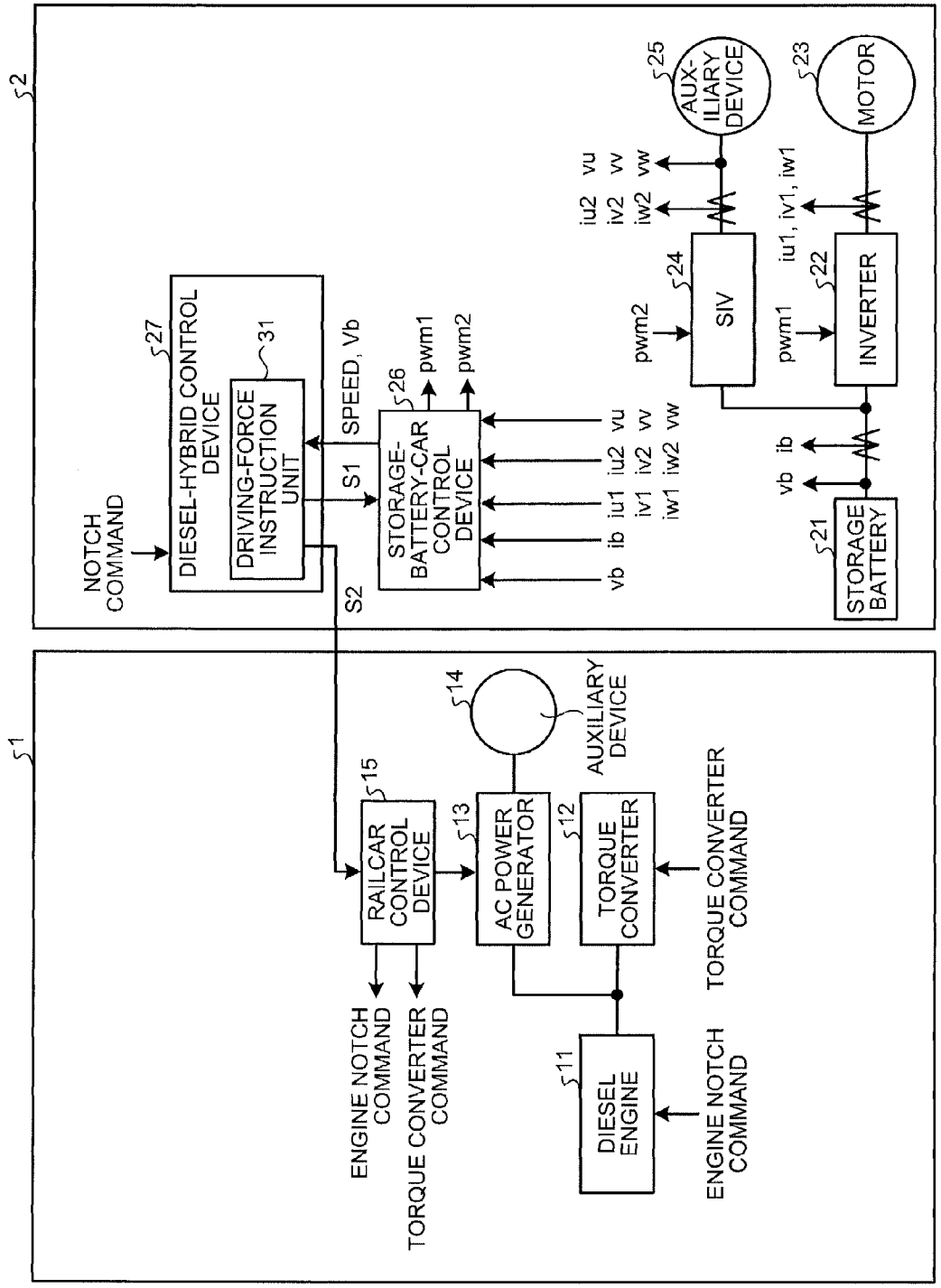
FIG. 2 is an example of a signal flow in the vehicle system according to the first embodiment.

FIG. 2 is an example of a signal flow in the vehicle system according to the present embodiment. As shown in FIG. 2, the diesel-hybrid control device 27 includes a driving-force instruction unit 31 that instructs the storage-battery-car control device 26 and the railcar control device 15 about starting and stopping driving the storage battery car 2 and the railcar 1, a driving force, and the like. Based on a notch command from the operator cab, the driving-force instruction unit 31 in the diesel-hybrid control device 27 in the storage battery car 2 instructs the storage-battery-car control device 26 and the railcar control device 15 about an operation mode (a driving force) such as accelerating, braking, and coasting corresponding to the notch command by using instruction signals S1 and S2, respectively. The instruction signals S1 and S2 can be provided in any mode. However, when an instruction is provided in the same form as a normal notch command, the degree of modification to existing railcars and storage battery cars can be reduced.

Based on the instruction (the instruction signal S2) from the diesel-hybrid control device 27, the railcar control device 15 outputs an engine notch command for instructing the diesel engine 11 to drive or stop the wheel 16, drive or stop the AC power generator 13, and the like in order to control the diesel engine 11. The railcar control device 15 outputs a torque converter command for instructing the torque converter 12 about a torque to control a torque to be transmitted by the torque converter 12.

When the diesel engine 11 receives an instruction to drive or stop the wheel 16 from the railcar control device 15, the diesel engine 11 drives or stops the wheel 16 through the torque converter 12 based on the instruction. When the diesel engine 11 receives an instruction to drive or stop the AC power generator 13 from the railcar control device 15, the diesel engine 11 drives or stops the AC power generator 13.

Based on an instruction from the diesel-hybrid control device 27, the storage-battery-car control device 26 outputs a pulse width modulation (PWM) signal (a pwm1 signal) for switching the inverter 22 to the inverter 22. The storage-battery-car control device 26 outputs a PWM signal (a pwm2 signal) for switching the SIV 24 to the SIV 24.

The inverter 22 converts DC power of the storage battery 21 into AC power based on the pwm1 signal. The inverter 22 inputs a current of the converted AC power (a motor current: iu1, iv1, and iw1) to the storage-battery-car control device 26. Furthermore, a voltage and a current of DC power output from the storage battery 21 (a storage-battery voltage and a storage-battery current: vb and ib) are input to the storage-battery-car control device 26. The storage-battery-car control device 26 generates the pwm1 signal such that the motor current reaches a desired value.

The SIV 24 converts DC power of the storage battery 21 into AC power based on the pwm2 signal and supplies the converted AC power to the auxiliary device 25. A current of the AC power output from the SIV 24 (an SIV output current: iu2, iv2, and iw2) and a voltage of the AC power output from the SIV 24 (an SIV output voltage: vu, vv, and vw) are input to the storage-battery-car control device 26.

Figure 3:
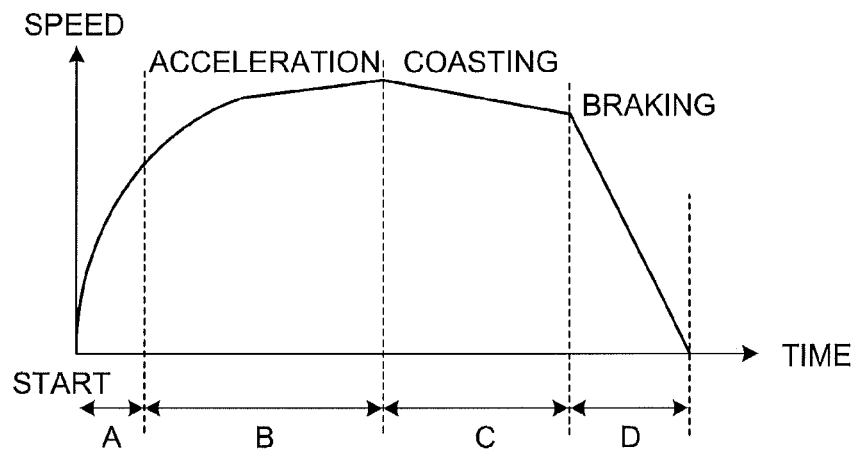
FIG. 3 is an example of speed characteristics of the vehicle system.
Figure 4:
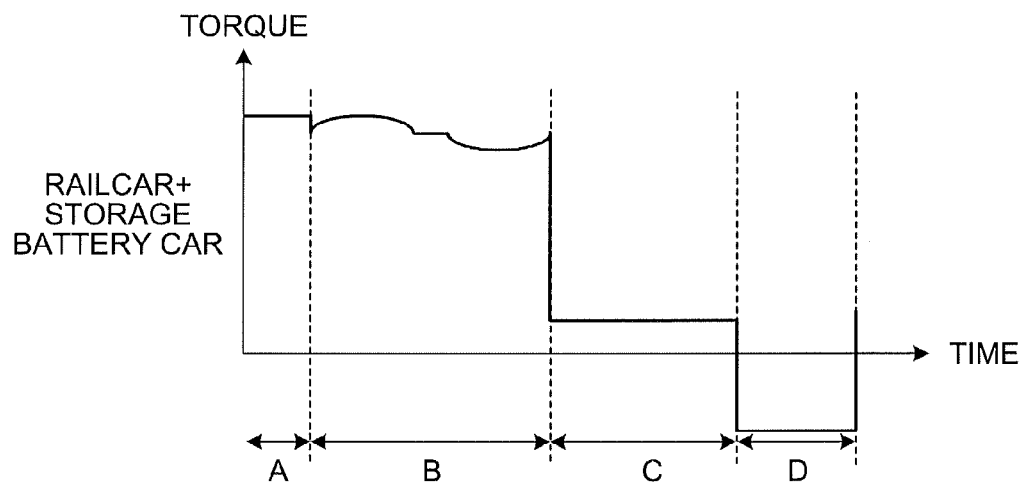
FIG. 4 is an example of total torque characteristics of a railcar and a storage battery car.
Figure 5:
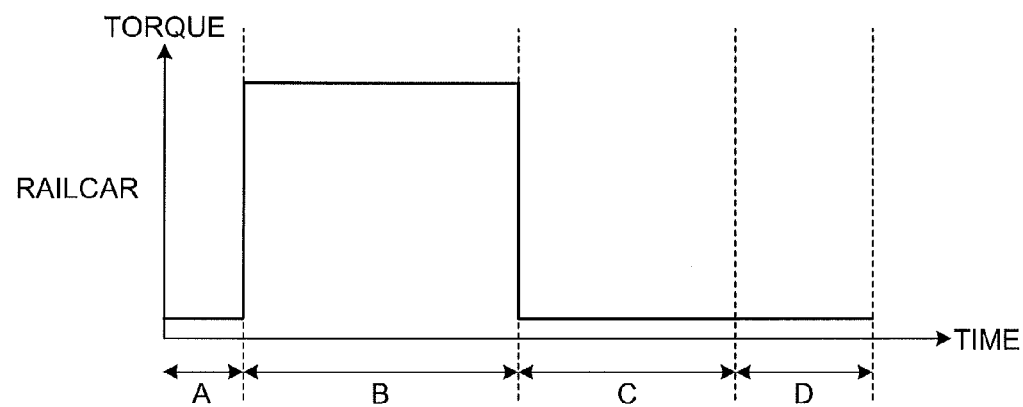
FIG. 5 is an example of torque characteristics of the railcar.
Figure 6:
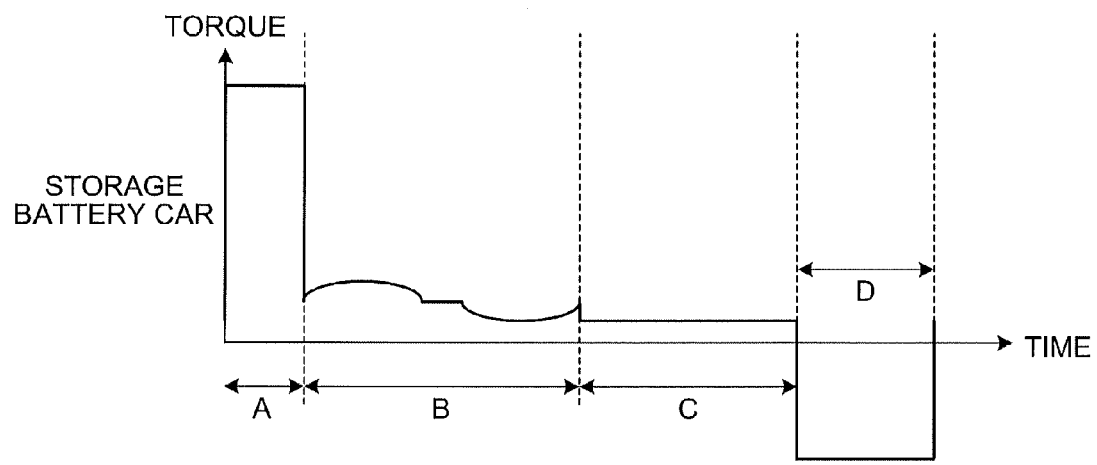
FIG. 6 is an example of torque characteristics of the storage battery car.

Next, an operation of the present embodiment is explained. FIG. 3 is an example of speed characteristics of a vehicle system. FIG. 4 is an example of total torque characteristics of the railcar 1 and the storage battery car 2 corresponding to the speed characteristics in FIG. 3. FIG. 5 is an example of torque characteristics of the railcar 1 corresponding to the speed characteristics in FIG. 3. FIG. 6 is an example of torque characteristics of the storage battery car 2 corresponding to the speed characteristics in FIG. 3. An operation of the present embodiment is explained below by using the examples shown in FIGS. 3 to 6.

At the time of starting (starting to drive) the train including the vehicle system (a period A in FIGS. 3 to 6), according to an acceleration notch command, the diesel-hybrid control device 27 instructs the storage-battery-car control device 26 to convert DC power of the storage battery 21 into AC power by the inverter 22 to drive the motor 23. The diesel-hybrid control device 27 drives the SIV 24. The SIV 24 supplies AC power to the auxiliary device 25. At this time, the diesel-hybrid control device 27 does not instruct the railcar control device 15 to drive the wheel 16 (instructs to be on standby for driving the wheel 16), and instructs the railcar control device 15 to drive the AC power generator 13. Under this condition, the diesel engine 11 is in an idling state, and does not generate a driving force because the torque converter 12 and the wheel 16 are not connected to each other. The diesel engine 11 drives the AC power generator 13 to supply AC power to the auxiliary device 14.

In this manner, at the time of starting, power from the railcar 1 is not used to drive the vehicle system, and both the railcar 1 and the storage battery car 2 run using power from the storage battery car 2. Therefore, the diesel-hybrid control device 27 instructs the storage-battery-car control device 26 to drive the vehicle system using a driving force required for the railcar 1 and the storage battery car 2 to run at the time of starting.

Thereafter, until the vehicle system has left a station (until a certain time has elapsed from the starting or the vehicle system has run a certain distance from the starting) or until the vehicle system reaches a certain speed, the vehicle system continues not to be driven by power from the railcar 1, but to run using power from the storage battery car 2.

After the train has left the station or the train speed has exceeded a certain speed (a period B in FIGS. 3 to 6), the diesel-hybrid control device 27 instructs the railcar control device 15 to drive the railcar 1, and the railcar control device 15 instructs the diesel engine 11 to drive the wheel 16 and instructs the torque converter 12 about a torque. Accordingly, a force of the diesel engine 11 is transmitted to the wheel 16 to generate power. A torque instructed by the diesel engine 11 can be decided in any manner. However, for example, when a value of the torque is decided to optimize an output of the diesel engine 11 for operating in a fuel efficient state, efficient running can be achieved. The AC power generator 13 continues to supply AC power to the auxiliary device 14. FIG. 4 is an example in which after the train has left the station or its speed has exceeded a certain speed, a torque of the railcar 1 is kept at a certain value (for example, a value to optimize an output of the diesel engine 11 for operating in a fuel efficient state).

Meanwhile, the storage battery car 2 generates a driving force by an amount (including any amount increased or decreased according to railroad conditions and the like) obtained by subtracting an amount of a driving force generated by the railcar 1 from an amount of a driving force required for a formation combining the railcar 1 and the storage battery car 2. This driving force (torque) of the storage battery car 2 is decided by the driving-force instruction unit 31 in the diesel-hybrid control device 27, which recognizes the torque of the railcar 1, based on the speed and the like of the vehicle system. The driving force of the storage battery car 2 can also be decided by the storage-battery-car control device 26. The diesel-hybrid control device 27 or the storage-battery-car control device 26 is supposed to recognize the speed of the vehicle system through an accelerometer or the like mounted in a wheel.

Thereafter, when the driving-force instruction unit 31 in the diesel-hybrid control device 27 receives a notch command for a coasting control (a period C in FIGS. 3 to 6), the driving-force instruction unit 31 instructs the railcar control device 15 to stop driving the wheel 16 (the diesel engine 11 is in an idling state). According to this instruction, the railcar control device 15 stops transmitting power from the torque converter 12 to the wheel 16. The AC power generator 13 continues to supply AC power to the auxiliary device 14.

The diesel-hybrid control device 27 also instructs the storage-battery-car control device 26 to stop driving the wheel 28. According to this instruction, the storage-battery-car control device 26 stops an operation of the inverter 22 and stops driving the motor 23. The SIV 24 continues to convert DC power of the storage battery 21 into AC power to supply the AC power to the auxiliary device 25.

When a braking notch command is received (a period D in FIGS. 3 to 6), the diesel-hybrid control device 27 instructs the storage-battery-car control device 26 to brake. According to this instruction, the storage-battery-car control device 26 controls the motor 23 to operate as a power generator, the inverter 22 to convert regenerative electric power into DC power, and the storage battery 21 to be charged with the DC power. In a conventional railcar 1, energy generated at the time of braking cannot be absorbed. However, in the present embodiment, energy generated at the time of braking can be absorbed into the storage battery 21 of the storage battery car 2 through the operation described above.

Figure 7:
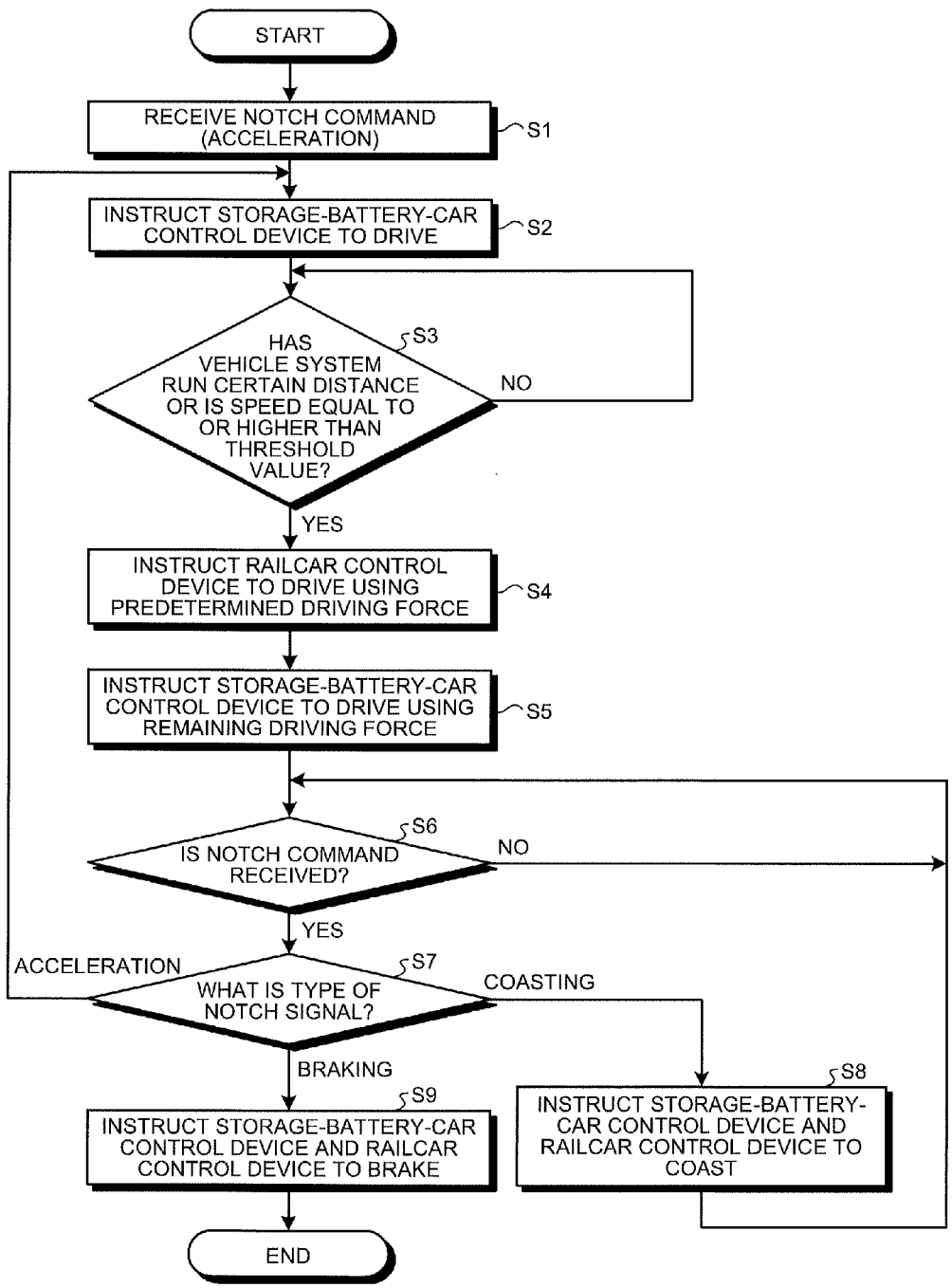
FIG. 7 is an example of a control procedure in a diesel-hybrid control device.

FIG. 7 is an example of a control procedure in the diesel-hybrid control device 27 according to the present embodiment. An operation of the diesel-hybrid control device 27 is explained with reference to FIG. 7. First, in an initial state, the vehicle system is supposed to be stopped. When the diesel-hybrid control device 27 receives an acceleration notch command (Step S1), the diesel-hybrid control device 27 instructs the storage-battery-car control device 26 to drive the wheel 28 using power from the storage battery car 2 and starts running the vehicle system (Step S2). At this time, the diesel-hybrid control device 27 also instructs the storage-battery-car control device 26 to supply AC power from the SIV 24 to the auxiliary device 25, and instructs the railcar control device 15 to supply AC power to the auxiliary device 14.

Next, the diesel-hybrid control device 27 determines whether the vehicle system has run a certain distance from the starting of the run or the speed of the running vehicle system is equal to or higher than a threshold value (Step S3). It suffices that either one of whether the running distance from the starting of the run is equal to or longer than a certain distance and whether the speed of the running vehicle system is equal to or higher than a threshold value is determined at Step S3. However, other conditions (for example, whether a certain time has elapsed from the starting of the run) can also be used to perform a determination. When the vehicle system has run a certain distance from the starting of the run or the speed of the running vehicle system is equal to or higher than a threshold value (YES at Step S3), the diesel-hybrid control device 27 instructs the railcar control device 15 to drive the wheel 16 using a predetermined driving force (Step S4), and also instructs the storage-battery-car control device 26 to drive the wheel 28 using a driving force by an amount obtained by subtracting an amount of the driving force instructed to the railcar control device 15 from an amount of a required driving force (Step S5).

When the vehicle system has not yet run a certain distance from the starting of the run or the speed of the running vehicle system is lower than a threshold value (NO at Step S3), Step S3 is repeated.

After Step S5, the diesel-hybrid control device 27 determines whether a notch command is received (Step S6).

When the notch command is received (YES at Step S6), the diesel-hybrid control device 27 determines a type of the received notch command (Step S7). When the notch command is not received (NO at Step S6), Step S6 is repeated.

When the received notch command is determined to be a coasting command at Step S7 (coasting at Step S7), the diesel-hybrid control device 27 instructs the storage-battery-car control device 26 and the railcar control device 15 to coast (Step S8), and the control procedure returns to Step S6. Furthermore, when the received notch command is determined to be an acceleration command at Step S7 (accelerating at Step S7), the control procedure returns to Step S2.

When the received notch command is determined to be a braking command at Step S7 (braking at Step S7), the diesel-hybrid control device 27 instructs the storage-battery-car control device 26 and the railcar control device 15 to brake (Step S9). At this time, as described above, according to the braking instruction, the storage-battery-car control device 26 controls the motor 23 to operate as a power generator, the inverter 22 to convert regenerative electric power into DC power, and the storage battery 21 to be charged with the DC power.

The control procedure described above is only an example. A control method is not limited thereto, and any control method can be used as long as the control method is to run the vehicle system using only power from the storage battery car 2 until the vehicle system has run a certain distance from the starting or until the speed of the running vehicle system is equal to or higher than a threshold value, and then to run the vehicle system using power from both the storage battery car 2 and the railcar 1.

The railcar control device 15 is connected to an operator cab as described above, and therefore the railcar 1 is capable of running by itself using its own driving force according to a notch command from the operator cab, in the same manner as conventional techniques. The storage battery car 2 is also capable of running by itself in the same manner.

While the present embodiment has described an example in which one railcar 1 and one storage battery car 2 are coupled with each other, the present invention is not limited thereto, and a plurality of at least one of the railcar 1 and the storage battery car 2 can be coupled with the other. For example, in a case of a plurality of railcars 1, it suffices that the diesel-hybrid control device 27 instructs the railcars 1 about a driving force allocated to each of the railcars 1 at Step S4. In a case of a plurality of the storage battery cars 2, it suffices that one diesel-hybrid control device 27 instructs the storage battery cars 2 about a driving force allocated to each of the storage battery cars 2 at Step S5.

In the present embodiment, while it has been explained that the storage battery car 2 includes the diesel-hybrid control device 27, the railcar 1 can include the diesel-hybrid control device 27, and the diesel-hybrid control device 27 can be omitted from the storage battery car 2.

While the railcar 1 has been explained as an example in the above descriptions, the control method of the vehicle system according to the present embodiment is also applicable to a case where a diesel locomotive is used in place of the railcar 1. Various electric power storage devices (such as a lithium ion battery, a nickel hydrogen battery, an electric double-layer capacitor, a lithium ion capacitor, and a flywheel) can be used as the storage battery 21.

As described above, in the present embodiment, the storage battery car 2 including the diesel-hybrid control device 27 is coupled with an existing railcar 1, such that the diesel-hybrid control device 27 (the driving-force instruction unit 31) controls the railcar 1 and the storage battery car 2 to run using a driving force of the storage battery car 2 at the time of starting and accelerating the vehicle system. When the speed of the vehicle system is equal to or higher than a certain speed, the railcar 1 and the storage battery car 2 run using a driving force of both the railcar 1 and the storage battery car 2. Therefore, in addition to effectively utilizing a conventional railcar, fuel efficiency can be improved and noise level can be reduced at the time of starting and accelerating, as compared to the conventional railcar. Furthermore, regenerative electric power can be absorbed into the storage battery 21 of the storage battery car 2 at the time of braking, and therefore energy saving can be achieved. Furthermore, the life of a diesel engine of a railcar is extended.

Further, because the storage battery car 2 is capable of running by itself, in a case of a small transport load, a short transport distance, or the like, only the storage battery car 2 runs, thereby achieving energy saving, noise level reduction, and low cost.

Second Embodiment.

Figure 8:
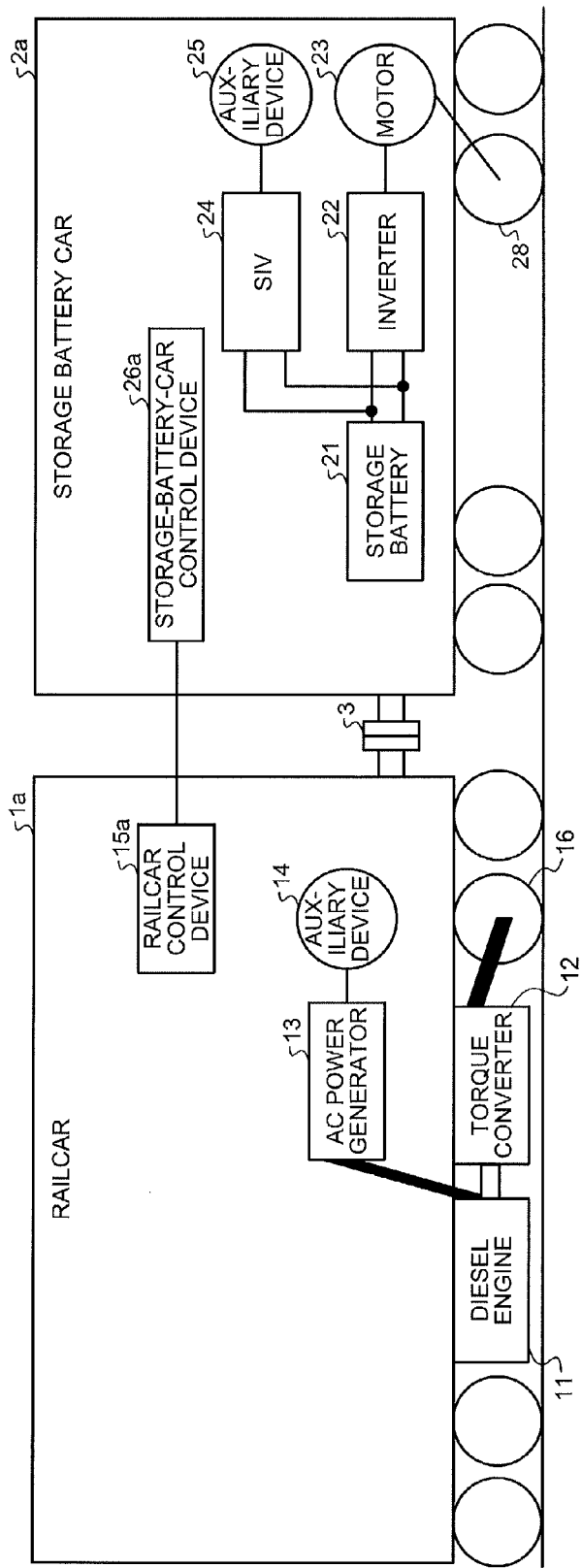
FIG. 8 is a configuration example of a vehicle system according to a second embodiment.

FIG. 8 is a configuration example of a vehicle system according to a second embodiment of the present invention. As shown in FIG. 8, the vehicle system according to the present embodiment is constituted by a railcar 1a and a storage battery car 2a, and the railcar 1a and the storage battery car 2a are coupled by the coupler 3. The railcar 1a is the same as the railcar 1 according to the first embodiment except that the railcar 1a includes a railcar control device 15a in place of the railcar control device 15 in the railcar 1 according to the first embodiment. The storage battery car 2a is the same as the storage battery car 2 according to the first embodiment except that the storage battery car 2a includes a storage-battery-car control device 26a in place of the storage-battery-car control device 26 in the storage battery car 2 according to the first embodiment, and the diesel-hybrid control device 27 is omitted. The storage-battery-car control device 26a and the railcar control device 15a are connected by a wire or the like. Constituent elements having functions identical to those of the first embodiment are denoted by same reference signs used in the first embodiment and redundant explanations thereof will be omitted.

Figure 9:
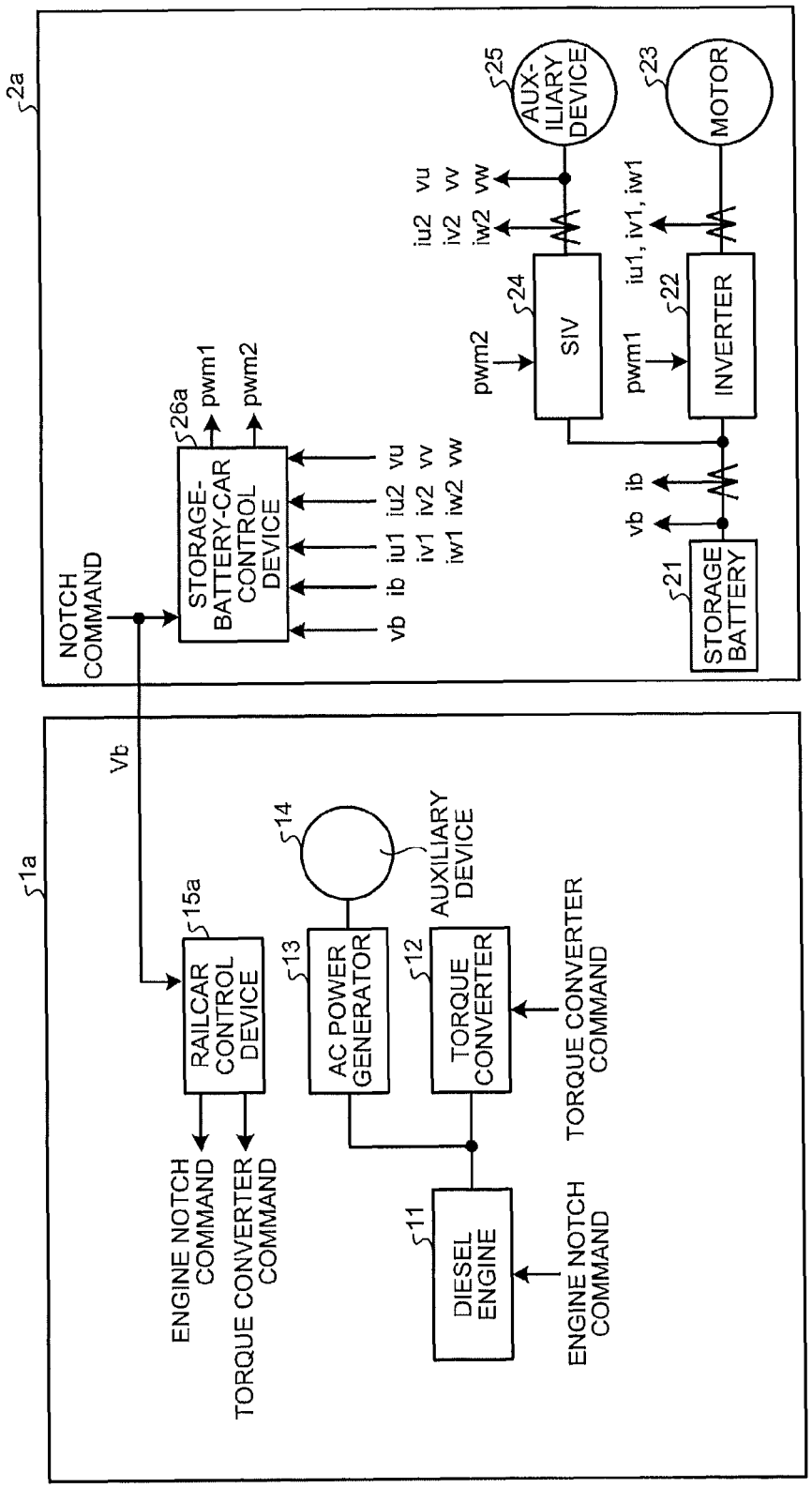
FIG. 9 is an example of a signal flow in the vehicle system according to the second embodiment.

FIG. 9 is an example of a signal flow in the vehicle system according to the present embodiment. In the present embodiment, the railcar 1a and the storage battery car 2a are controlled to run using a driving force of the storage battery car 2a at the time of starting and accelerating the vehicle system, similarly to the first embodiment. In the present embodiment, the diesel-hybrid control device 27 according to the first embodiment is not provided, and based on a notch command from an operator cab, the railcar control device 15a and the storage-battery-car control device 26a respectively control the railcar 1a and the storage battery car 2a to exhibit the same driving force characteristics as those in the first embodiment (for example, the characteristics exemplified in FIGS. 3 to 6).

That is, in the present embodiment, the railcar control device 15a and the storage-battery-car control device 26a constitute a vehicle system control device. The storage-battery-car control device 26a has a function of generating an instruction signal related to driving the storage battery car 2a among functions of the driving-force instruction unit 31 according to the first embodiment. The railcar control device 15a has a function of generating an instruction signal related to driving the railcar 1a among the functions of the driving-force instruction unit 31 according to the first embodiment.

The storage-battery-car control device 26a and the railcar control device 15a receive a notch command from an operator cab, similarly to the first embodiment. In the present embodiment, a command for instructing to be either in a diesel hybrid mode or a normal mode is added as the notch command from the operator cab. In a case of receiving a command for instructing to be in the diesel hybrid mode, a driving force of the railcar 1a and a driving force of the storage battery car 2a are coordinated to run the railcar 1a and the storage battery car 2a. In a case of receiving a command for instructing to be in the normal mode, the railcar 1a and the storage battery car 2a operate in the same manner as respective conventional types of railcars and storage battery cars. Either the diesel hybrid mode or the normal mode can be set by another method without using any notch command from the operator cab. For example, when a formation of the vehicle system is decided, either the diesel hybrid mode or the normal mode can be set to each of the storage-battery-car control device 26a and the railcar control device 15a.

Next, an operation in the diesel hybrid mode according to the present embodiment is explained. In the present embodiment, during the period A in FIGS. 3 to 6, the storage-battery-car control device 26a receives an acceleration notch command from the operator cab, and instructs the inverter 22 to convert DC power of the storage battery 21 into AC power to drive the motor 23. The storage-battery-car control device 26a drives the SIV 24. The SIV 24 supplies AC power to the auxiliary device 25. Meanwhile, the railcar control device 15a renders the diesel engine 11 in an idling state, and does not connect the torque converter 12 to the wheel 16 not to generate a driving force. The diesel engine 11 drives the AC power generator 13 to supply AC power to the auxiliary device 14. In this manner, at the time of starting, power from the railcar 1 is not used to drive the vehicle system, and both the railcar 1a and the storage battery car 2a run using power from the storage battery car 2a.

After the vehicle system has left a station or its speed has exceeded a certain speed (the period B in FIGS. 3 to 6), the railcar control device 15a instructs the torque converter 12 about a torque to optimize an output of the diesel engine 11 for operating in a fuel efficient state, and instructs the diesel engine 11 to drive the wheel 16. Meanwhile, the storage battery car 2a generates a driving force by an amount (including any amount increased or decreased according to railroad conditions and the like) obtained by subtracting an amount of a driving force generated by the railcar 1a from an amount of a driving force required for a formation combining the railcar 1a and the storage battery car 2a.

Each of the storage-battery-car control device 26a and the railcar control device 15a can determine whether the vehicle system has left the station or its speed has exceeded a certain speed. Alternatively, either one of the storage-battery-car control device 26a and the railcar control device 15a can perform the determination and notify the other of a determination result. A method of allocating a driving force to the railcar 1a and the storage battery car 2a is predetermined, and according to this method, the storage-battery-car control device 26a and the railcar control device 15a can execute respective controls. For example, in a case of adopting a torque to optimize an output of the diesel engine 11 for operating the railcar 1a in a fuel efficient state, the railcar control device 15a notifies the storage-battery-car control device 26a of the torque.

Thereafter, during the periods C and D in FIGS. 3 to 6, the storage-battery-car control device 26a and the railcar control device 15a perform their respective operations corresponding to coasting and braking, similarly to the first embodiment, based on an instruction from an operator cab in place of an instruction from the diesel-hybrid control device 27. Operations other than those described above are identical to those of the first embodiment.

As described above, in the present embodiment, the diesel-hybrid control device 27 is not provided, and based on a notch command from an operator cab, the railcar control device 15a and the storage-battery-car control device 26 respectively control the railcar 1a and the storage battery car 2a to run in the same manner as the first embodiment. Therefore, the present embodiment can achieve effects identical to those of the first embodiment without including the diesel-hybrid control device 27.

INDUSTRIAL APPLICABILITY

As described above, the vehicle system control device according to the present invention is useful for a vehicle system including a railcar, and is particularly suitable for a vehicle system aiming to achieve energy saving, noise level reduction, and low cost.

REFERENCE SIGNS LIST 1, 1a railcar
2, 2a storage battery car
3 coupler
11 diesel engine
12 torque converter
13 AC power generator
14, 25 auxiliary device
15, 15a railcar control device
16, 28 wheel
21 storage battery
22 inverter
23 motor
24 SIV
26, 26a storage-battery-car control device
27 diesel-hybrid control device
31 driving-force instruction unit

The invention claimed is:

1. A vehicle system control device that controls a vehicle system of a train in which a railcar that is configured to run by itself by driving a wheel using an output of a diesel engine and a storage battery car that is configured to run by itself by driving a wheel by a motor driven by electric power from a storage battery are coupled, wherein
the storage battery car includes a driving-force instruction unit that provides an instruction signal for instructing about a driving force to a railcar control device included in the railcar and a storage-battery-car control device included in the storage battery car,
the driving-force instruction unit generates an instruction signal for instructing to start driving the storage battery car and generates an instruction signal for instructing to be on standby for driving the railcar at a time of starting the train, allocates a driving force to the railcar and to the storage battery car at a time of accelerating after starting the train, and generates an instruction signal for instructing about a driving force of the railcar and an instruction signal for instructing about a driving force of the storage battery car based on an allocation result,
the railcar control device outputs a command to the diesel engine and controls the diesel engine based on the instruction signal generated by the driving-force instruction unit, and
when a running distance from the time of starting the train is equal to or longer than a threshold value, the driving-force instruction unit generates an instruction signal for instructing to start driving the railcar by a diesel engine, generates an instruction signal for instructing about a driving force of the railcar, and generates an instruction signal for instructing about a driving force, obtained by subtracting a driving force instructed as a driving force of the railcar from a desired driving force of the train, as a driving force of the storage battery car.

* * * * *